(12) United States Patent
Wakitani et al.

(10) Patent No.: US 6,860,348 B2
(45) Date of Patent: Mar. 1, 2005

(54) ELECTRIC VEHICLE

(75) Inventors: Tsutomu Wakitani, Wako (JP);
Tsutomu Inui, Wako (JP); Hiroo Kanke, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/278,204

(22) Filed: Oct. 22, 2002

(65) Prior Publication Data

US 2003/0079924 A1 May 1, 2003

(30) Foreign Application Priority Data

Oct. 25, 2001 (JP) ........................................ 2001-328089
Oct. 30, 2001 (JP) ........................................ 2001-333224
Oct. 30, 2001 (JP) ........................................ 2001-333231

(51) Int. Cl.[7] .............................................. B60K 1/00
(52) U.S. Cl. ..................................... 180/65.1; 180/65.8
(58) Field of Search ................................ 180/65.1, 65.2, 180/65.3, 65.4, 65.5, 65.8, 300, 308, 165, 248, 197; 318/432, 373, 433, 447, 112, 139, 802, 11, 778; 37/257, 219, 234, 266

(56) References Cited

U.S. PATENT DOCUMENTS 4,399,886 A * 8/1983 Pollman .................... 180/197
4,472,663 A * 9/1984 Melocik ..................... 318/447
4,529,919 A * 7/1985 Melocik et al. ............ 318/373
4,686,434 A * 8/1987 Kojima et al. .............. 318/112
5,289,890 A * 3/1994 Toyoda et al. ............. 180/65.8
5,294,871 A * 3/1994 Imaseki ...................... 318/139
5,304,912 A * 4/1994 Kajiwara et al. ........... 318/802
5,363,933 A * 11/1994 Yu et al. ..................... 180/6.5
5,465,806 A * 11/1995 Higasa et al. ............... 180/165
5,704,439 A * 1/1998 Kitahama et al. .......... 180/65.1
6,349,782 B1 * 2/2002 Sekiya et al. .............. 180/65.2
6,470,603 B2 * 10/2002 Hanafusa et al. ............. 37/257
6,541,938 B2 * 4/2003 Okamura et al. ........... 318/778
6,543,548 B1 * 4/2003 Ichikawa et al. ........... 180/248
6,566,826 B2 * 5/2003 Imai et al. .................... 318/11

FOREIGN PATENT DOCUMENTS

JP          59017807         1/1984

* cited by examiner

Primary Examiner—Hau Phan
(74) Attorney, Agent, or Firm—Adams & Wilks (57) ABSTRACT

A dual-motor electric vehicle having a control section that determines whether three conditions are satisfied, (1) that a straight-ahead travel instruction has been supplied to the vehicle, (2) that an actual number of motor rotations of an electric motor is less than a target number of motor rotations, and (3) that a motor control signal for bringing the actual number of motor rotations closer to the target number has reached a predetermined upper limit output value. When all conditions are satisfied for at least one of the electric motors of the dual-motor vehicle, the control section performs a downward motor-rotation correction process for at least one of motors by incrementally reducing one of the target number of motor rotations and the upper limit output value of the motor control signal until the respective actual numbers of rotations of the left and right motors substantially coincide with each other.

20 Claims, 9 Drawing Sheets

ELECTRIC VEHICLE

FIELD OF THE INVENTION

The present invention relates to techniques for keeping appropriate straight-ahead traveling capability or performance of electric vehicles.

In recent years, electric vehicles, having their driving wheels driven by one or more electric motors, have come into remarkable widespread use primarily because they do not discharge exhaust gas.

Generally, the electric vehicles in practical use today can be classified into two types: a single-motor type that is constructed to drive left and right driving wheels via a single driving axle and single electric motor; and a dual-motor type that is constructed to drive left and right driving wheels via left and right electric motors, respectively. While the dual-motor type electric vehicle is easy to manipulate when making a left or right turn, it tends to bring about a difference in the number of rotations between the left and right driving wheels, which can prevent straight-ahead traveling performance of the electric vehicle. Particularly, when the electric vehicle is traveling on a bumpy road and either one of the driving wheels encounters significant resistance from irregularities on the surface of the road, the electric vehicle may not be able to travel straight ahead appropriately, despite a straight travel instruction given by a human operator.

Improved dual-motor type electric vehicle, capable of traveling straight ahead irrespective of road surface conditions, is proposed, for example, in Japanese Patent Laid-open Publication No. SHO-59-17807. The proposed electric vehicle is constructed in such a manner that, when the rotating speed of either one of the motors corresponding to the left and right driving wheels has decreased due to an increased load on the one motor, a vehicle-travel correction circuit of the vehicle further reduces the actual rotating speed of the one motor. In response to the thus further-reduced rotating speed, a powering control circuit associated with the one motor produces greater motor driving output to cause the one motor to rotate at higher speed, so that the electric vehicle can again travel straight ahead without making an undesired turn.

More specifically, the electric vehicle proposed in the above-identified Japanese publication is arranged to further compulsorily reduce the rotating speed of one of the driving wheels, which has lowered due to the increased load on the motor, so as to increase a difference between the actual and instructed (target) rotating speeds so that the powering control circuit operates to raise the rotating speed of the one driving wheel. Namely, once a decrease in the rotating speed of any one of the driving wheels is detected, speed correction control is performed in the electric vehicle such that the rotating speed of the one driving wheel is first further reduced compulsorily and then the rotating speed of the one driving wheel is raised by the powering control circuit; during the speed correction control performed on the one driving wheel, the relatively great rotating speed of the other driving wheel is left unchanged.

As a consequence, the respective rotating speeds of the left and right driving wheels in the proposed electric vehicle can again substantially coincide with each other. However, during the period of the above-mentioned speed correction control (although the period is very short), the rotating speed of the one driving wheel is compulsorily reduced to a considerable degree, which thereby causes the electric vehicle to make an undesired turn. The electric vehicle thus arranged tends to make small turns, which would prevent the vehicle from achieving smooth travel and appropriate straight-ahead traveling performance.

SUMMARY OF THE INVENTION

In view of the foregoing prior art problems, it is an object of the present invention to provide a novel electric vehicle which, even when any one of driving wheels is subjected to an increased load, can keep smooth travel and appropriate straight-ahead traveling performance.

To accomplish the above-mentioned object, the present invention provides an electric vehicle comprising: left and right electric motors; left and right driving wheels drivable by said left and right electric motors, respectively; and a control section arranged to: produce a motor control signal to bring an actual number of motor rotations closer to a target number of motor rotations; and for each of said left and right electric motors, (a) determine whether or not three predetermined conditions have been satisfied, the three predetermined conditions being that a straight-ahead travel instruction has been given, that the actual number of motor rotations of the electric motor is less than the target number of motor rotations and that the motor control signal has reached its predetermined upper-limit output value, and (b) when it is determined that the three predetermined conditions have been satisfied for at least one of the left and right electric moors, perform a downward motor-rotation correction process to progressively reduce the target number of motor rotations or the upper-limit output value of the motor control signal until the respective actual numbers of rotations of the left and right motors to substantially coincide with each other.

The actual number of motor rotations may fall below the target number of motor rotations, during straight-ahead travel of the electric vehicle, such as when the electric vehicle is traveling on an extremely bumpy road or uphill road. Particularly, when the actual number of motor rotations of at least one of the left and right propelling motors has fallen below the target number of motor rotations due to irregularities on the road surface, the electric vehicle can undesirably turn left or right despite the straight-ahead travel instruction. To avoid such an inconvenience, the control section of the present invention is arranged such that when the actual number of motor rotations of either one of the left and right propelling motors has fallen below the target number of motor rotations, the target number of motor rotations or the upper-limit output value of the motor control signal for the one propelling motor is downwardly corrected or reduced, and the downwardly corrected target number of motor rotations or upper-limit output value of the motor control signal is set to be a new target number of motor rotations or upper-limit output value of the motor control signal common to the left and right propelling motors before the next processing loop is executed. The downward correction of the target number of motor rotations or upper-limit output value of the motor control signal is repeated each time the three predetermined conditions have been satisfied, so that the target number of motor rotations or upper-limit output value of the motor control signal common to the left and right propelling motors progressively decreases. During that time, the left and right propelling motors are controlled to follow the downwardly corrected target number of motor rotations or upper-limit output value of the motor control signal. As a result, the respective actual numbers of rotations of the left and right electric motors become substantially coincide with each other, and appropriate straight-ahead traveling performance of the electric vehicle is realized.

The upper-limit output value of the motor control signal defines a maximum (i.e., greatest possible) rotating speed of the electric motor at a given time. Thus, the downward motor-correction process of the present invention, which is directed to reducing the upper-limit output value of the motor control signal, can lower the maximum rotating speed of the electric motor. When the motor control signal has not yet reached the predetermined upper-limit output value, there is still room to increase the traveling speed of the vehicle, in which case the downward motor-rotation correction process of the invention is not executed. This is why the invention additionally applies the condition regarding the upper-limit output value of the motor control signal.

In one preferred form of the present invention, the control section performs the downward motor-rotation correction process by subtracting a given number of motor rotations from the last target number of moor rotations.

In another preferred form of the present invention, the control section performs the downward motor-rotation correction process by subtracting a given value from the last upper-limit output value of the motor control signal.

In a further preferred form of the present invention, the control section performs the downward motor-rotation correction process by multiplying the last target number of motor rotations by a positive coefficient smaller than 1.0.

In still another preferred form of the present invention, the control section performs the downward motor-rotation correction process by multiplying the last upper-limit output value of the motor control signal by a positive coefficient smaller than 1.0

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

First, it should be noted that the terms "front", "rear", "left", "right", "upper", "lower", etc. represent directions as viewed by a human operator operating an electric vehicle of the present invention to be detailed hereinbelow, and that letters "L" and "R" attached to some reference numerals represent left and right sides of the electric vehicle as viewed by the human operator.

Figure 1:
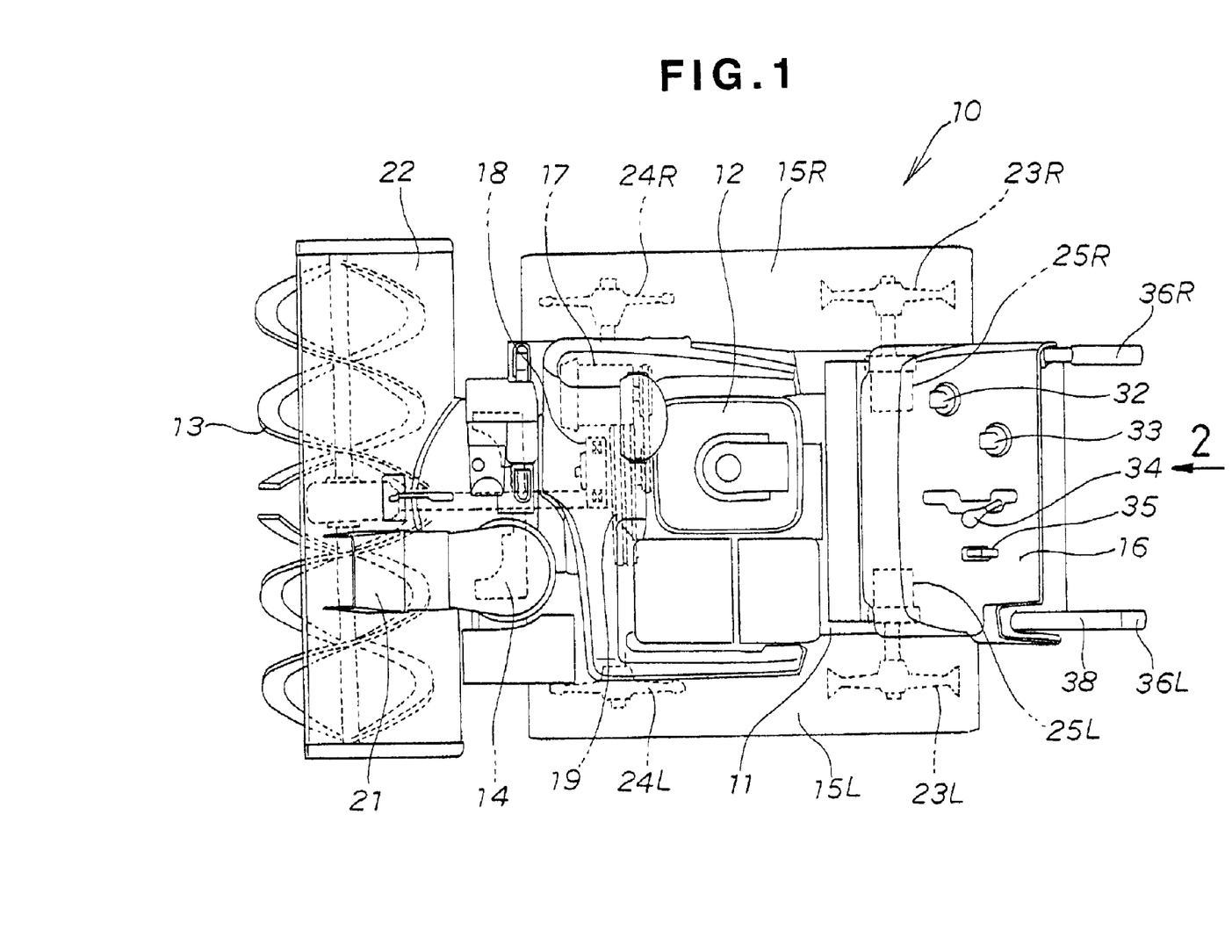
FIG. 1 is a plan view of a snow removing machine in accordance with an embodiment of the present invention.

FIG. 1 is a plan view of the electric vehicle in accordance with an embodiment of the present invention, which is embodied as a snow removing machine 10. The snow removing machine 10 includes a machine body 11, an engine 12 mounted on the machine body 11, a working section mounted at a front portion of the machine body 11 and including an auger 13 and blower 14, crawlers 15L and 15R mounted on left and right sides of the machine body 11, and an operation panel 16 mounted at a rear portion of the machine body 11. The snow removing machine 10 is a walking-type electric working machine that is operated by a human operator behind the operation panel 16. Details of the operation panel 16 will be described in detail in relation to FIG. 2.

Further, in the snow removing machine 10 of FIG. 1, an electric power generator 17 is driven by the engine 12, and electric power generated by the power generator 17 is supplied to both a battery 43 (FIG. 4) disposed under the operation panel 16 and left and right electric motors (i.e., propelling motors) 25L and 25R to be later described.

The output of the engine 12 is also supplied via an electromagnetic clutch 18 and belt 19 to the working section so that the auger 13 and blower 14, constituting the working section (denoted at 45 in FIG. 4), can be rotated or driven by the engine output. The auger 13 functions to gather snow accumulated on the ground toward the middle of the machine 10, and the blower 14 receives and projects the thus-gathered snow to desired positions around the machine body 11 via a chute 21. The auger 13 is partly covered with an auger housing 22.

The left crawler 15L is wound on a driving wheel 23L and idler wheel 24L; in the instant embodiment of the present invention, the driving wheel 23L can be rotated in forward and reverse directions via the left propelling motor 25L. Similarly, the right crawler 15R is wound on a driving wheel 23R and idler wheel 24R, and the driving wheel 23R can be rotated in forward and reverse directions via the right propelling motor 25R.

In contrast to the traditional snow removing machines where both the working section (i.e., auger-rotating section) and the propelling section (i.e., crawler-driving section) are driven by a single gasoline (petrol) engine or diesel engine, the snow removing machine 10 of the present invention is designed to drive the working section (i.e., auger-rotating section) by means of the engine 12 and drive the propelling section (i.e., crawler-driving section) by means of the electric motors (propelling motors) 25L and 25R. Such a driving scheme is employed in the instant embodiment on the ground that the traveling speed and turning movements of the machine 10 and switching between forward and rearward travel of the machine 10 can be suitably controlled finely by the electric motors while the working section subject to rapid load variations can be suitably driven by the powerful inner-combustion engine.

Figure 2:
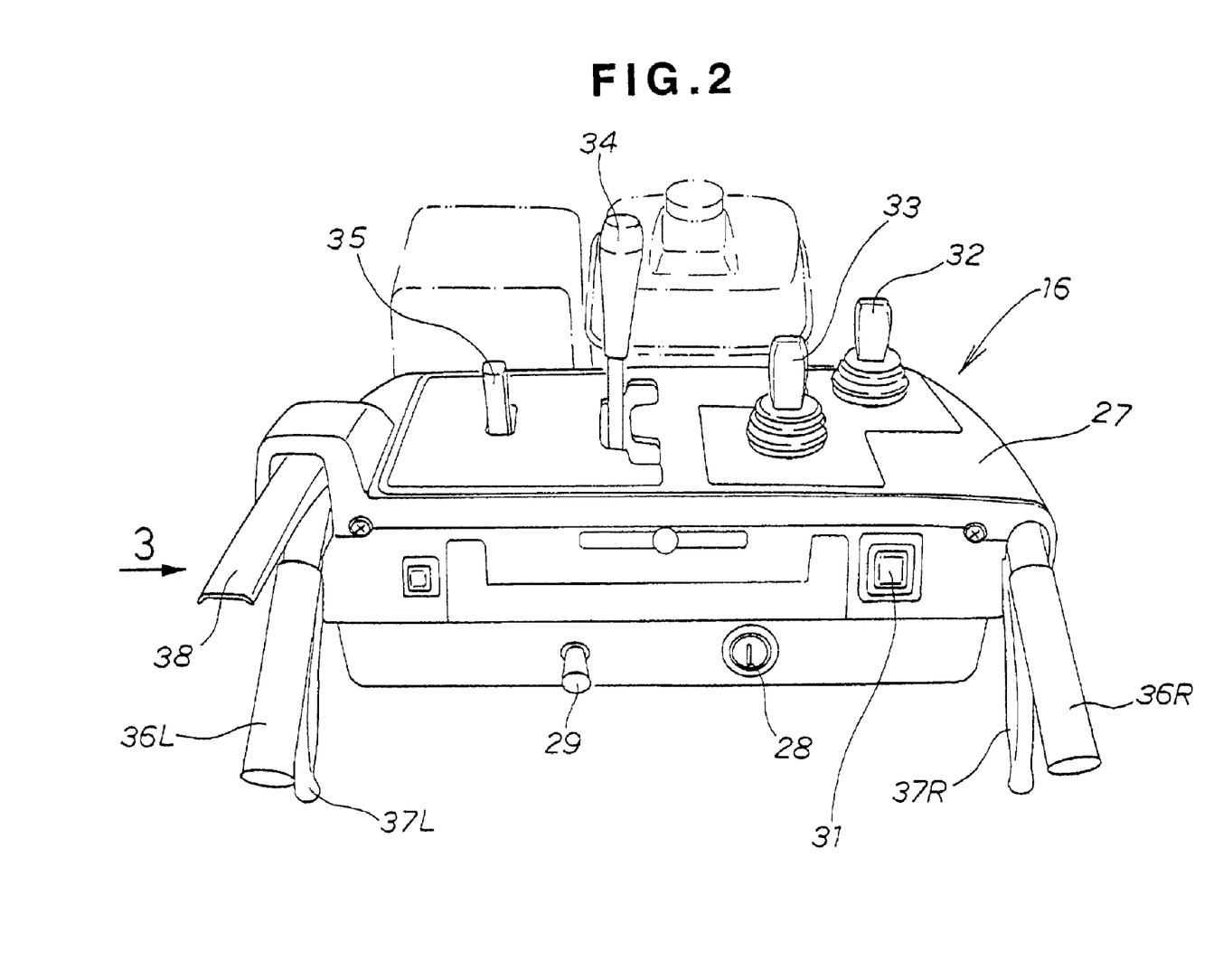
FIG. 2 is a view of the snow removing machine taken in a direction of arrow "2" of FIG. 1.

FIG. 2 is a view of the snow removing machine 10 taken in a direction of arrow "2" of FIG. 1. As shown, the operation panel 16 includes, on its surface right behind the rear end of an operation box 27, a main switch 28, an engine choke 29, a clutch operating button 31, etc. The operation panel 16 also includes, on the upper surface of the operation box 27, a snow-projecting-direction adjusting lever 32, an auger-housing-position adjusting lever 33, a direction/speed control lever 34 associated with the propelling section of the machine, and an engine throttle lever 35 associated with the working section of the machine. Further, a right grip 36R and right-turning operation lever 37R are provided to the right of the operation box 27, and a left grip 36L and left-turning operation lever 37L and travel-standby lever 38 are provided to the left of the operation box 27.

The left-turning and right-turning operation levers 37L and 37R are similar to ordinary brake levers, but, unlike the brake levers, they can not perform complete braking. These levers 37L and 37R are each operable to reduce the rotating speed of the corresponding propelling motor 25L or 25R to turn the machine body 11 to the left or right. This is why these levers 37L and 37R are referred to as "left-turning and right-turning operation levers" instead of being called brake levers.

The main switch 28 is a well-known type of switch for insertion therein of a main key so that the engine 12 can be activated by turning, in a predetermined direction, of the inserted main key. Pulling the engine choke 29 toward the human operator can increase the concentration of an air/fuel mixture in the engine 12. The snow-projecting-direction adjusting lever 32 is operable to change the operating direction of the chute 21 (FIG. 1), and the auger-housing-position adjusting lever 33 is operable to change the position of the auger housing 22 (FIG. 1).

Figure 3:
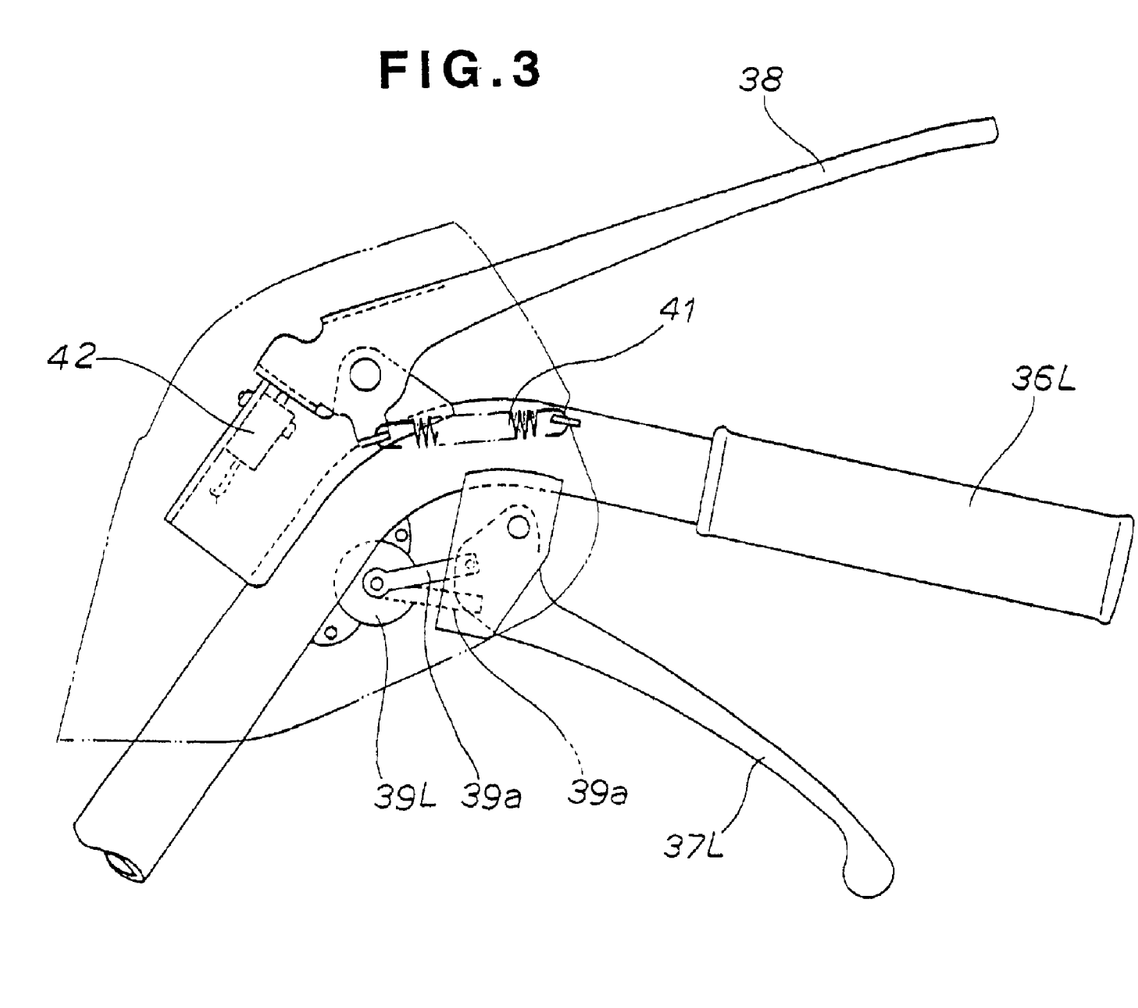
FIG. 3 is a view taken in a direction of arrow "3" of FIG. 2.

FIG. 3 is a view taken in a direction of arrow "3" of FIG. 2. The human operator can cause an arm 39a of a potentiometer 39L to pivot downwardly to a position denoted by a phantom (dot-and-dash) line, by gripping the left-turning operation lever 37L together with the grip 36L. The potentiometer 39L generates an electric signal corresponding to a current rotational position of the arm 39a.

Further, the travel-standby lever 38 is provided for turning on/off a switch 42. Namely, the switch 42 is kept in an ON state as long as the travel-standby lever 38 is held in a free or released position, as shown in FIG. 3, by a tension force of a spring 41. The switch 42 is turned off as the travel-standby lever 38 is caused to pivot downwardly (clockwise in FIG. 3) with the left hand of the human operator. Thus, whether or not the travel-standby lever 38 is being gripped together with the grip 36L can be detected via the switch 42.

Figure 4:
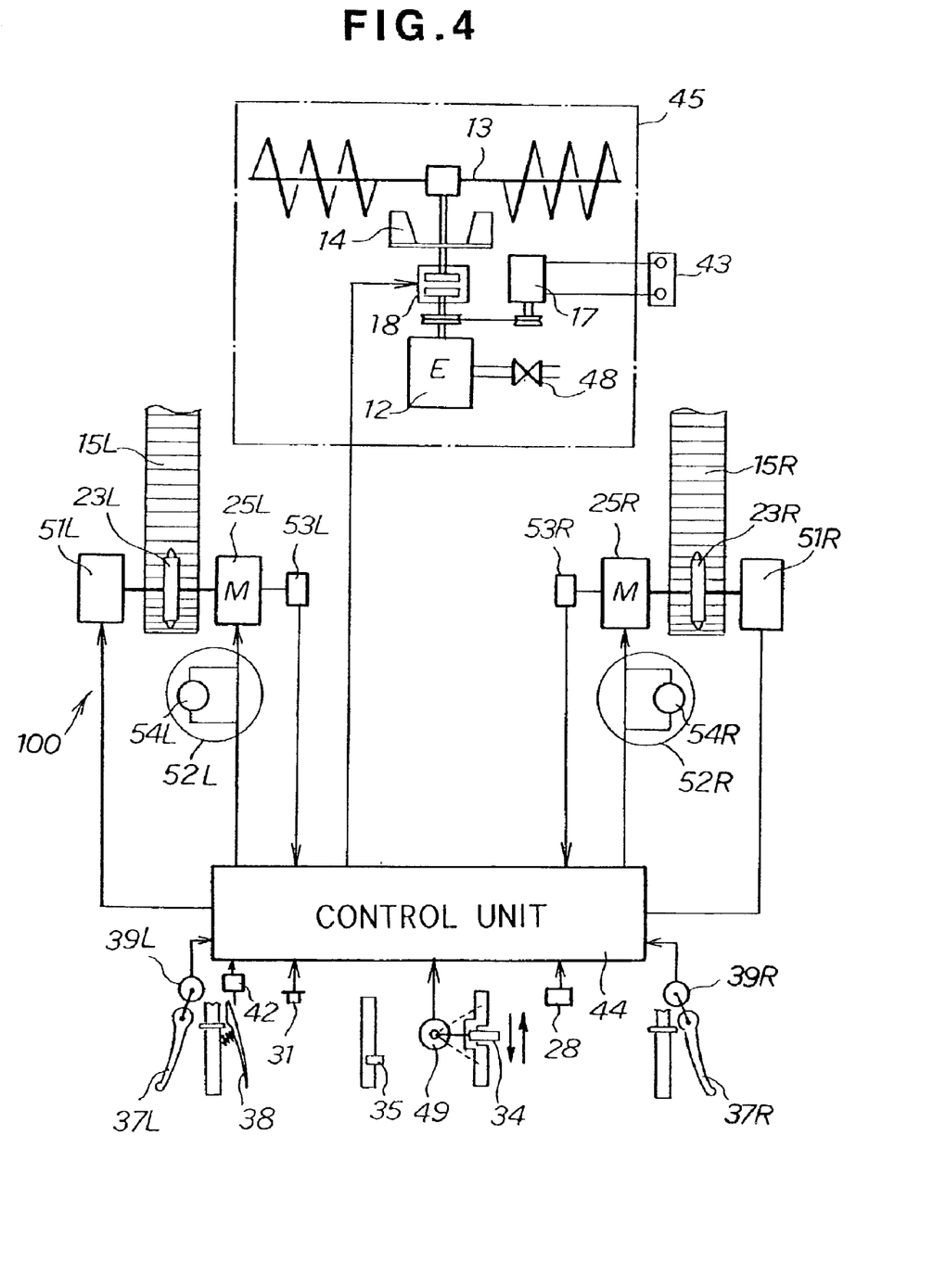
FIG. 4 is a diagram illustrating a general setup of a control system of the snow removing machine.

FIG. 4 is a diagram illustrating a general setup of a control system of the snow removing machine 10, which particularly shows various hardware components and information transfer paths of a control section or unit 44 incorporated in or attached to the above-mentioned operation panel 16. The engine 12, electromagnetic clutch 18, blower 14 and auger 13, enclosed together by a phantom-line (in this case, dot-and-dash line) block, together constitute the working section 45, and the remaining components together constitute the propelling section 100. Reference numeral 43 represents the battery.

The working section 45 in the instant embodiment operates as follows. The human operator inserts the main key in the main switch 28 and turns the inserted key to a predetermined engine start position, so that the engine 12 is activated through rotation of a self starter motor (not shown).

The engine throttle lever 35 is operatively connected via a not-shown throttle wire to the throttle valve 48, and thus the opening of the throttle valve 48 can be controlled by the human operator manipulating the engine throttle lever 35. In this way, the number of rotations of the engine 12 can be controlled as desired.

Further, by gripping the travel-standby lever 38 together with the left grip 36L and activating the clutch operating button 31, the human operator can bring the electromagnetic clutch 18 to a connected state so as to rotate the blower 14 and auger 13 as the operator desires. The human operator can bring the electromagnetic clutch 18 back to a disconnected state by either releasing the travel-standby lever 38 or activating the clutch operating button 31.

The propelling section 100 in the instant embodiment operates as follows. The snow removing machine 10 of the present invention includes left and right electromagnetic brakes 51L and 51R that correspond in function to parking brakes of an ordinary motor vehicle. During parking, these electromagnetic brakes 51L and 51R are held in a braking state under the control of the control section 44. The electromagnetic brakes 51L and 51R are released in the following manner.

Namely, once the direction/speed lever 34 is shifted to a "forward" or "reverse" region (FIG. 5) while the main switch 28 is in the engine start position and the travel-standby lever 38 is being gripped together with the left grip 36L, the electromagnetic brakes 51L and 51R are brought to a released (non-braking) state.

Figure 5:
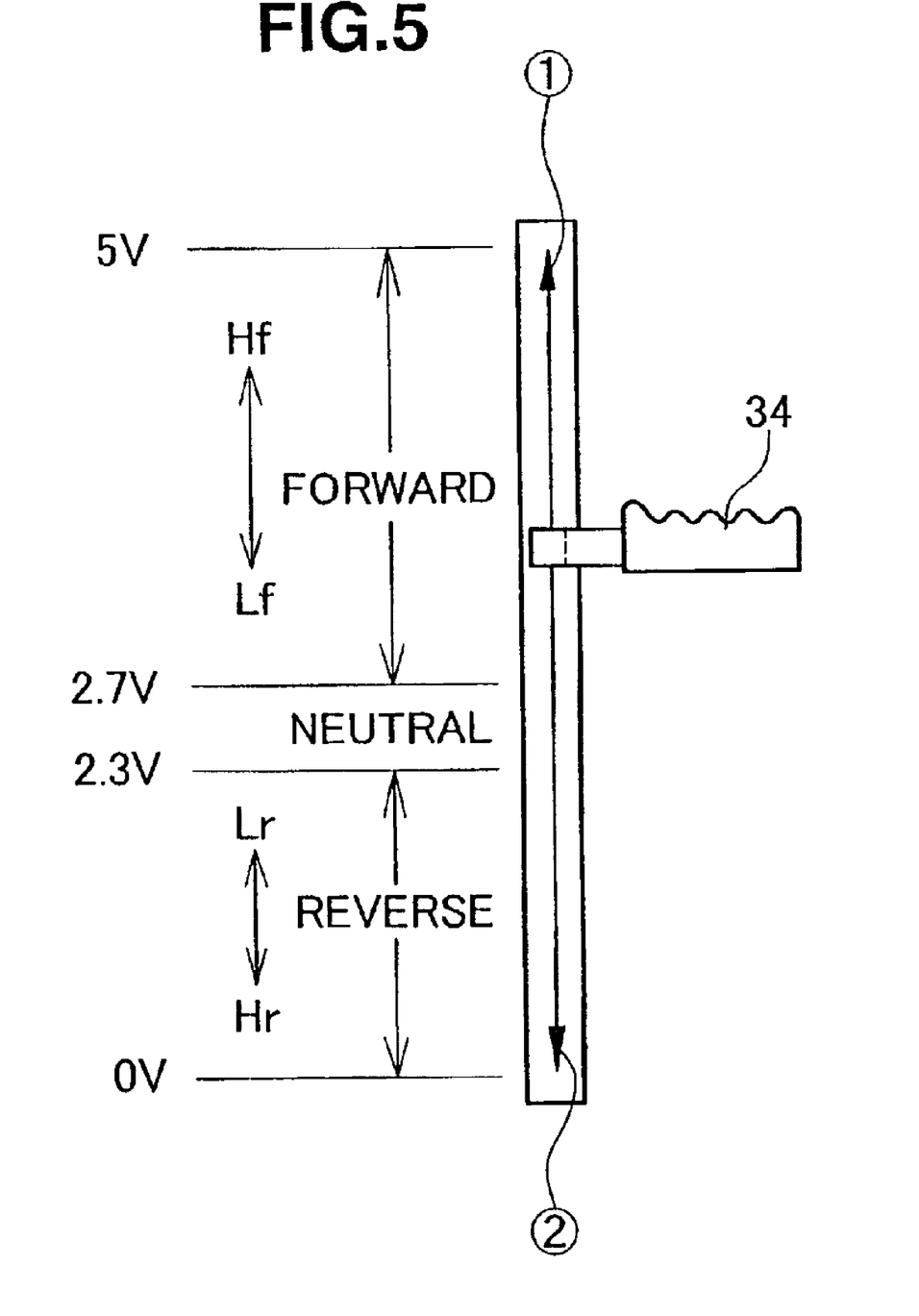
FIG. 5 is a view explanatory of operation of a direction/speed lever employed in the snow removing machine of the invention.

FIG. 5 is a view explanatory of operation of the direction/speed lever 34 employed in the instant embodiment. The direction/speed lever 34 can be moved reciprocatively in opposite directions as denoted by arrow ① and arrow ②. Turning the direction/speed lever 34 to the "forward" region beyond a "neutral region" can advance or travel forward the snow removing machine 10. In the "forward" region, the traveling speed of the machine 10 can be controlled between a low forward speed Lf and a high forward speed Hf. Further, turning the direction/speed lever 34 to the "reverse" region beyond the "neutral region" can reverse or travel rearward (i.e., back up) the machine 10. In the "reverse" region, the traveling speed of the machine 10 can be controlled between a low reverse speed Lr and a high reverse speed Hr. In this embodiment, the potentiometer generates a voltage corresponding to a current position (i.e., position information) of the direction/speed lever 34; for example, the potentiometer generates O volt (V) when the direction/speed lever 34 is at the highest-reverse-speed position, 5 V when the lever 34 is at the highest-forward-speed position, and 2.3 V–2.7 V when the lever 34 is in the neutral region. The direction/speed lever 34 is so called because it can set both a forward or rearward traveling direction and a traveling speed of the snow removing machine 10.

Referring back to FIG. 4, the control section 44, which receives, from the potentiometer 49, the position information of the direction/speed lever 34, rotates the left and right propelling motors 25L and 25R via left and right motor drivers 52L and 52R, detects respective rotating speeds of the drive motors 25L and 25R via corresponding rotation sensors 53L and 53R, and then performs feedback control of the propelling motors 25L and 25R, on the basis of rotation detection signals output from the rotation sensors 53L and 53R, so that the respective rotating speeds of the motors 25L and 25R take on desired speed values. As a consequence, the left and right driving wheels 23L and 23R can be rotated at a desired speed in a desired direction, so that the machine 10 can travel at a desired speed in the desired direction.

During the travel of the snow removing machine 10, the machine 10 can be braked in the following manner. In the instant embodiment, the motor drivers 52L and 52R include regenerative brake circuits 54L and 54R, respectively.

Generally speaking, the electric motor can be rotated by electric energy supplied thereto from a battery. The electric power generator, on the other hand, is a means for converting rotational force into electric energy. The present invention therefore uses an electrical switching scheme to allow the propelling motors 25L and 25R to also function as electric power generators for generating necessary electric power. If the voltage of the power thus generated by the propelling motors 25L and 25R is greater than the battery voltage, then the generated electric energy can be stored in the battery 43. This is the basic operating principle of the regenerative brake.

Gripping intensity with which the left-turning operation lever 37L is gripped by the human operator is detected by the potentiometer 39L, and the control section 44 actuates the left regenerative brake circuit 54L, in accordance with a detection signal output from the potentiometer 39L, to thereby reduce the rotating speed of the left propelling motor 25L. Similarly, gripping intensity with which the right-turning operation lever 37R is gripped by the human operator is detected by the potentiometer 39R, and the control section 44 actuates the right regenerative brake circuit 54R, in accordance with a detection signal output from the potentiometer 39R, to thereby reduce the rotating speed of the right propelling motor 25R.

Thus, in the instant embodiment, the human operator can turn the snow removing machine 10 leftward by gripping the left-turning operation lever 37L and turn the machine 10 rightward by gripping the right-turning operation lever 37R.

The travel of the snow removing machine 10 can be terminated in any one of the following three ways:
1) by returning the direction/speed lever 34 to the neutral region;
2) by releasing the travel-standby lever 38; and
3) by returning the main switch 28 to an OFF position.

As the main switch 28 is returned to the OFF position after the termination of the travel of the machine 10, the electromagnetic brakes 51L and 51R are brought to the braking state, which will achieve the same effect as when the parking brake is put on in an ordinary motor vehicle.

In the instant embodiment of the present invention, the traveling performance of the snow removing machine 10 can be controlled appropriately by the control section 44 performing at least one of examples of travel control processing as flowcharted in FIGS. 6 to 9.

Figure 6:
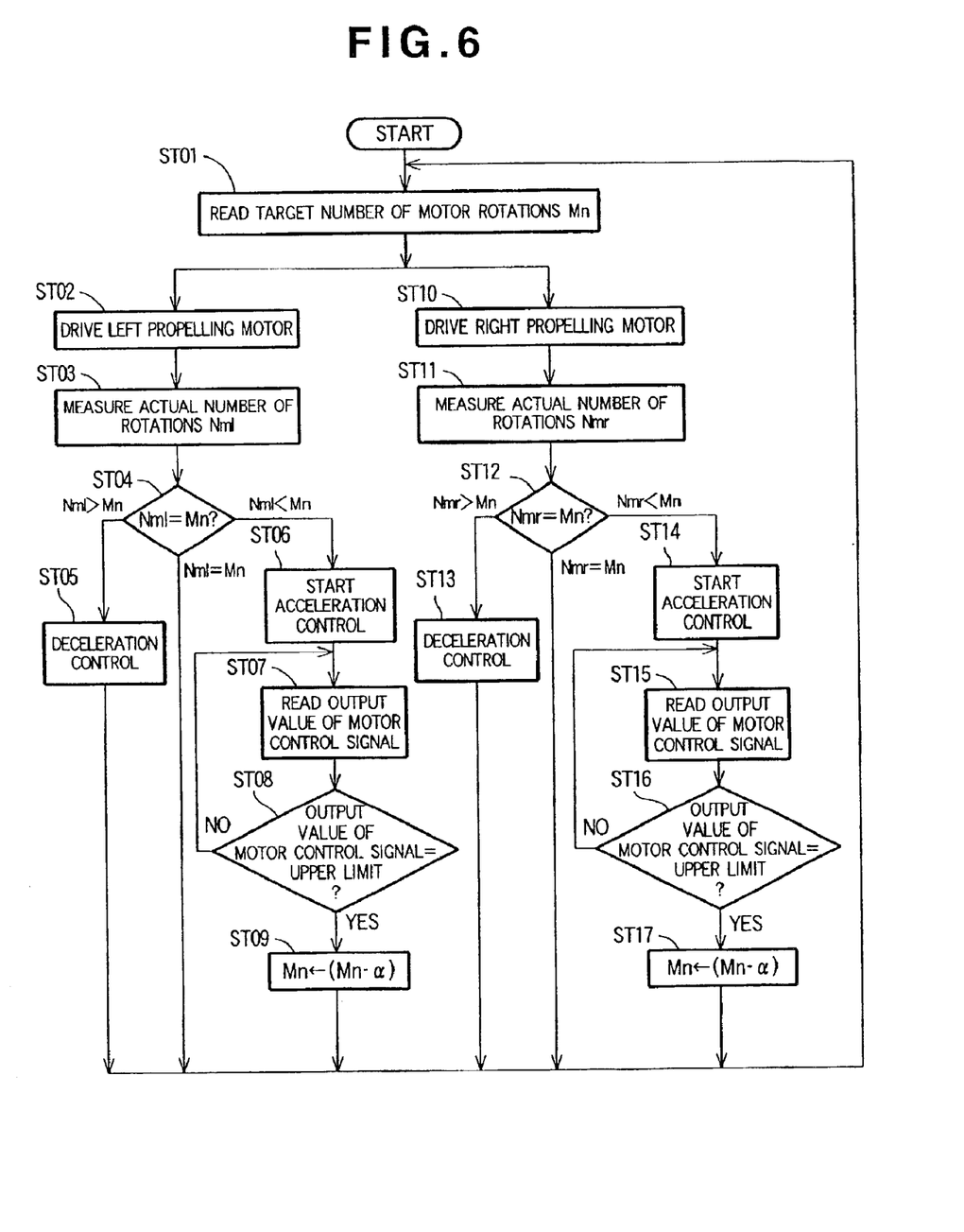
FIG. 6 is a flow chart showing an exemplary step sequence of a first example of travel control processing performed by a control section of the snow removing machine.

Now, with reference to FIG. 6, a detailed description will be given about the first example of the travel control processing performed by the control section 44 to allow the snow removing machine to appropriately travel straight ahead as instructed by the human operator without making undesired turns. FIG. 6 is a flow chart showing an exemplary step sequence of the first example of the travel control processing that is performed in the embodiment in response to a straight-ahead travel instruction given by the human operator. The straight-ahead travel instruction given by the human operator can be identified by detecting that the left- and right-turning operation levers 37L and 37R (FIG. 4) are both in the released (non-gripped) state.

Step ST01: The control section 44 reads a target number of motor rotations Mn. Note that in the instant example of the travel control processing, a value determined by a current position of the direction/speed lever 34 is set as an initial target number of motor rotations Mn.

Step ST02: The left propelling motor 25L is driven to take on the target number of motor rotations Mn read at step ST01.

Step ST03: Current actual number of motor rotations Nml of the left propelling motor 25L is measured by, for example, the rotation sensor 53L of FIG. 4.

Step ST04: It is determined whether the measured current actual number of motor rotations Nml is equal to the target number of motor rotations Mn. If an affirmative (YES) determination is made at this step, it means that there is no need to change the rotating state of the left propelling motor 25L, and thus the processing returns to step ST01 to repeat the above operations. If the current actual number of motor rotations Nml is greater than the target number of motor rotations Mn, it is judged that the left propelling motor 25L is rotating at an excessive speed, so that the processing proceeds to step ST05. If the current actual number of motor rotations Nml is smaller than the target number of motor rotations Mn, it is judged that the left propelling motor 25L is rotating at an insufficient speed, so that the processing branches to step ST06.

Step ST05: Deceleration control is carried out to correct the speed excess, and then the processing returns to step ST01 to repeat the above operations.

Step ST06: Acceleration control is initiated out to correct the speed insufficiency.

Step ST07: The control section 44 reads a current output value of a motor control signal for performing the acceleration control. This motor control signal may, for example, be a PI control signal if PI control is employed or PID control signal if PID control is employed. The greater the difference, from the target number of motor rotations, of the measured current actual number of motor rotations, the greater the output value of the motor control signal. Generally, in the instant embodiment, if the difference, from the target number of motor rotations, of the current actual motor rotations exceeds a predetermined value, the motor control signal is set at a predetermined upper-limit output value.

Step ST08: A determination is made as to whether or not the motor control signal for performing the acceleration control is currently representing the predetermined upper-limit output value. If the motor control signal for performing the acceleration control is not currently representing the predetermined upper-limit output value (i.e., with a NO determination), the processing returns to step ST07, while with a YES determination, the processing goes to step ST09.

Step ST09: The target number of motor rotations Mn is reduced or corrected downwardly by a value $\alpha$ (namely, "Mn−$\alpha$") to provide a corrected target number of motor rotations Mn for the left propelling motor 25L; in this case, the value "$\alpha$" is, for example, one r.p.m.

While the preceding paragraphs have described the control performed on the left propelling motor 25L, similar control is performed on the right propelling motor 25R as follows.

Step ST10: The right propelling motor 25R is driven to take on the target number of motor rotations Mn read at step ST01.

Step ST11: Current actual number of motor rotations Nmr of the right propelling motor 25R is measured by, for example, the rotation sensor 54R of FIG. 4.

Step ST12: It is determined whether the measured current actual number of motor rotations Nmr is equal to the target number of motor rotations Mn. With an affirmative answer, it means that there is no need to change the rotating state of the right propelling motor 25R, and thus the processing returns to step ST01 to repeat the above operations. If the current actual number of motor rotations Nmr is greater than the target number of motor rotations Mn, it is judged that the right propelling motor 25R is rotating at an excessive speed, so that the processing proceeds to step ST13. If the current actual number of motor rotations Nmr is smaller than the target number of motor rotations Mn, it is judged that the right propelling motor 25R is rotating at an insufficient speed, so that the processing branches to step ST14.

Step ST13: Deceleration control is carried out to correct the speed excess, and then the processing returns to step ST01 to repeat the above operations.

Step ST14: Acceleration control is initiated to correct the speed insufficiency.

Step ST15: The control section 44 reads a motor control signal for performing the acceleration control.

Step ST16: A determination is made as to whether or not the motor control signal for performing the acceleration control is currently representing the predetermined upper-limit output value. If the motor control signal for performing the acceleration control is not currently representing the predetermined upper-limit output value (i.e., with a NO determination), the processing returns to step ST15, while with a YES determination, the processing goes to step ST17.

Step ST17: The target number of motor rotations Mn is reduced or corrected downwardly by the value α (namely, "Mn−α") to provide a corrected target number of motor rotations Mn.

After completion of the operation at step ST09 or ST17, the processing of FIG. 6 returns to step ST01 where the corrected target number of motor rotations Mn is set as a new target number of rotor rotations Mn. The target number of motor rotations Mn read at next step ST01 will be thus smaller than the last target number of motor rotations Mn by the value α. Repeating the above-described operations will allow the respective actual numbers of rotations of the left and right propelling motors 25L and 25R to substantially coincide with each other so that the straight-ahead traveling performance of the snow removing machine can be ultimately restored, although it causes the target number of motor rotations Mn to become progressively smaller.

Namely, in the snow removing machine 10 where the left and right driving wheels 23L and 23R are driven by the left and right propelling motors 25L and 25R, the control section 44 performs the first example of the travel control processing of FIG. 6 which is characterized by carrying out the downward motor-rotation correction process for progressively reducing the target number of motor rotations (step ST09 or ST17 of FIG. 6) upon satisfaction of the three conditions that 1) the straight-ahead travel instruction has been given by the human operator, 2) the current actual number of motor rotations is smaller than the target number of motor rotations (step ST04 or ST12 of FIG. 6) and 3) the motor control signal produced to bring the actual number of motor rotations closer to the target number of motor rotations has reached its predetermined upper-limit output value (step ST08 or ST16 of FIG. 6).

The actual number of motor rotations may fall below the target number of motor rotations, during straight-ahead travel of the snow removing machine 10, such as when the machine 10 is traveling on an extremely bumpy road or uphill road. Particularly, when the actual number of motor rotations of either one of the left and right propelling motors has fallen below the target number of motor rotations due to irregularities on the road surface, the snow removing machine can undesirably turn left or right despite the straight-ahead travel instruction. To avoid such an inconvenience, the first example of the travel control processing is arranged in such a manner that, when the actual number of motor rotations of either one of the left and right propelling motors has fallen below the target number of motor rotations, it reduces the target number of motor rotations with a view to causing the respective actual numbers of rotations of the left and right motors to substantially coincide with each other and thereby keeping appropriate straight-ahead traveling performance of the snow removing machine.

Figure 7:
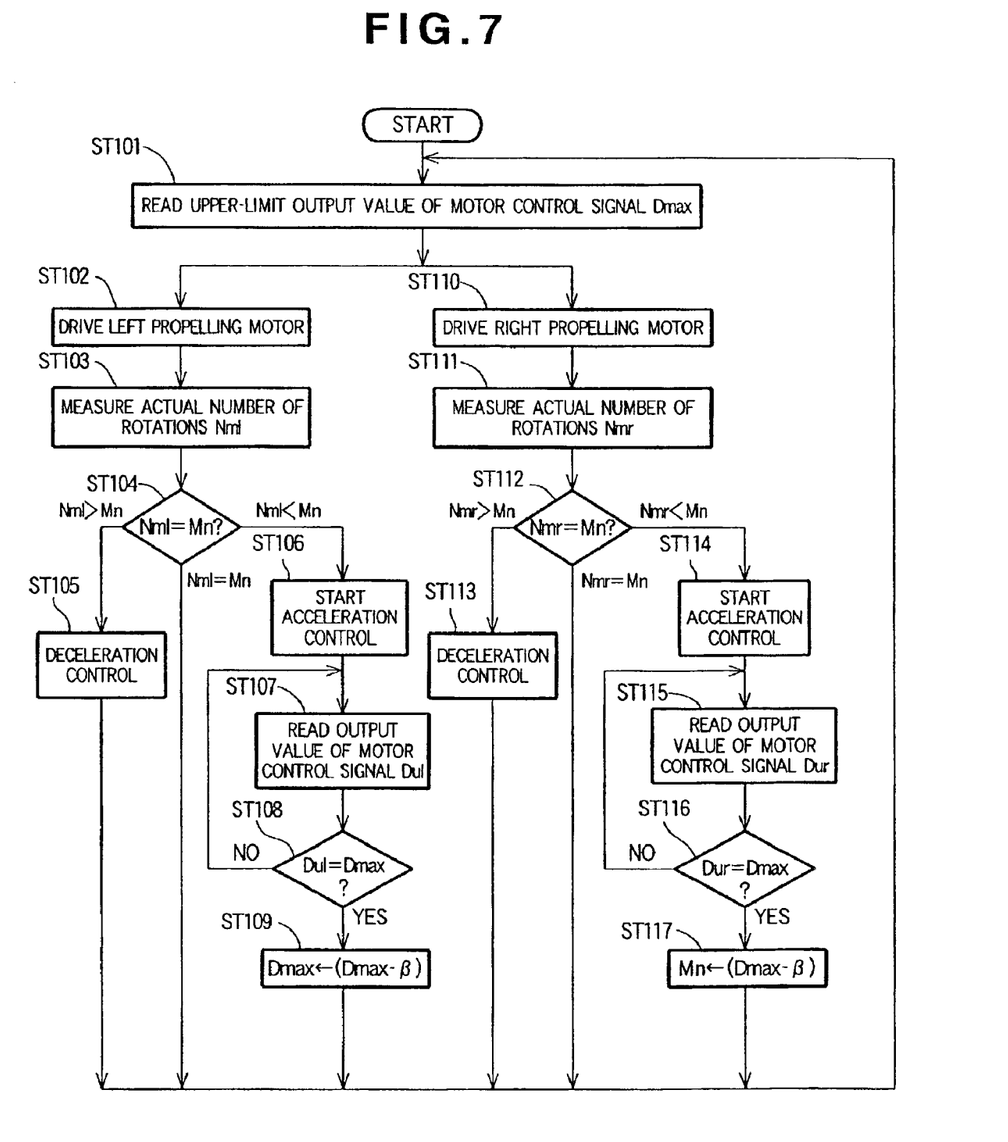
FIG. 7 is a flow chart showing an exemplary step sequence of another example of the travel control processing performed by the control section.

Next, with reference to FIG. 7, a detailed description will be given about the second example of the travel control processing performed by the control section 44 to allow the snow removing machine to appropriately travel straight ahead as instructed by the human operator. FIG. 7 is a flow chart showing an exemplary step sequence of the second example of the travel control processing.

Step ST101: The control section 44 reads a predetermined upper-limit output value Dmax of the motor control signal. Initial setting of the upper-limit output value Dmax of the motor control signal may be 100% or other suitable percentage (e.g., 90%) of a greatest possible output value of the motor control signal.

Step ST102: The control section 44 drives the left propelling motor 25L by outputting the motor control signal such that the propelling motor 25L takes on a target number of motor rotations Mn corresponding to a current position of the direction/speed lever 34. Note that in the instant example, the motor control signal tops out at the predetermined upper-limit output value Dmax; that is, in the instant example, the motor control signal is set so as to never exceed the predetermined upper-limit output value Dmax.

Step ST103: Current actual number of motor rotations Nml of the left propelling motor 25L is measured by, for example, the rotation sensor 53L of FIG. 4.

Step ST104: It is determined whether the measured current actual number of motor rotations Nml is equal to the target number of motor rotations Mn. If an affirmative determination is made at this step, it means that there is no need to change the rotating state of the left propelling motor 25L, and thus the processing returns to step ST101 to repeat the above operations. If the current actual number of motor rotations Nml is greater than the target number of motor rotations Mn, it is judged that the left propelling motor 25L is rotating at an excessive speed, so that the processing proceeds to step ST105. If the current actual number of motor rotations Nml is smaller than the target number of motor rotations Mn, it is judged that the left propelling motor 25L is rotating at an insufficient speed, so that the processing branches to step ST106.

Step ST105: Deceleration control is carried out to correct the speed excess, and then the processing returns to step ST101 to repeat the above operations.

Step ST106: Acceleration control is initiated to correct the speed insufficiency.

Step ST107: The control section 44 reads a current output value Dul of the motor control signal for performing the acceleration control. As in the above-described first example of the travel control processing flowcharted in FIG. 6, this motor control signal may, for example, be a PI control signal or PID control signal. The greater the difference, from the target number of motor rotations, of the current actual number of motor rotations, the greater the output value of the motor control signal. Generally, if the difference, from the target motor rotations, of the current actual motor rotations exceeds a predetermined value, the motor control signal is set at the predetermined upper-limit output value.

Step ST108: A determination is made as to whether or not the motor control signal for performing the acceleration control is currently representing the upper-limit output value Dmax. If the motor control signal for performing the acceleration control is not currently representing the predetermined upper-limit output value Dmax (i.e., with a NO determination), the processing returns to step ST107, while with a YES determination, the processing goes to step ST109.

Step ST109: The upper-limit output value Dmax of the motor control signal for the left propelling motor 25L is corrected downward by a value β (namely, Dmax−β) to provide a corrected upper-limit output value Dmax of the motor control signal; namely, in this case, the value "β" is, for example, one percent.

While the preceding paragraphs have described the control performed on the left propelling motor 25L, similar control is performed on the right propelling motor 25R as follows.

Step ST110: The control section 44 drives the right propelling motor 25R by outputting a motor control signal such that the propelling motor 25R takes on the target number of motor rotations Mn corresponding to the current position of the direction/speed lever 34. Note that in the instant example, the motor control signal tops out at the predetermined upper-limit output value Dmax; that is, in the instant example, the motor control signal is set so as to never exceed the predetermined upper-limit output value Dmax.

Step ST111: Current actual number of motor rotations Nmr of the right propelling motor 25R is measured by, for example, the rotation sensor 54R of FIG. 4.

Step ST112: It is determined whether the measured current actual number of motor rotations Nmr is equal to the target number of motor rotations Mn. If an affirmative determination is made at this step, it means that there is no need to change the rotating state of the right propelling motor 25R, and thus the processing returns to step ST101 to repeat the above operations. If the current actual number of motor rotations Nmr is greater than the target number of motor rotations Mn, it is judged that the right propelling motor 25L is rotating at an excessive speed, so that the processing proceeds to step ST113. If the current actual number of motor rotations Nmr is smaller than the target number of motor rotations Mn, it is judged that the right propelling motor 25R is rotating at an insufficient speed, so that the processing branches to step ST114.

Step ST113: Deceleration control is carried out to correct the speed excess, and then the processing returns to step ST101 to repeat the above operations.

Step ST114: Acceleration control is initiated to correct the speed insufficiency.

Step ST115: The control section 44 reads a current output value Dur of the motor control signal for performing the acceleration control.

Step ST116: A determination is made as to whether or not the motor control signal for performing the acceleration control is currently representing the upper-limit output value Dmax. If the motor control signal for performing the acceleration control is not currently representing the predetermined upper-limit output value (i.e., with a NO determination), the processing returns to step ST115, while with a YES determination, the processing goes to step ST117.

Step ST117: The upper-limit output value Dmax of the motor control signal for the right propelling motor 25R is corrected downward by the value β (namely, Dmax−β) to provide a corrected upper-limit output value Dmax of the motor control signal for the right propelling motor 25R.

After completion of the operation at step ST109 or ST117, the processing of FIG. 7 returns to step ST101 where the corrected upper-limit output value Dmaxr is set as a new upper-limit output value Dmax of the motor control signal. The upper-limit output value Dmax of the motor control signal read at next step ST101 will be thus smaller than the last upper-limit output value by the value β. Repeating the above operations will allow the respective actual numbers of motor rotations of the left and right propelling motors 25L and 25R to substantially coincide with each other so that the straight-ahead traveling performance of the machine 10 can be restored, although it causes the maximum numbers of motor rotations of the left and right propelling motors 25L and 25R to become progressively smaller.

Namely, the second example of the travel control processing of FIG. 7, performed by the control section 44 of the snow removing machine 10, is characterized by carrying out the downward motor-rotation correction process for progressively reducing the upper-limit output value of the motor control signal (step ST109 or ST117 of FIG. 7) upon satisfaction of the three predetermined conditions that the straight-ahead travel instruction has been given by the human operator, the current actual number of motor rotations is smaller than the target number of motor rotations (step ST104 or ST112 of FIG. 7) and the motor control signal produced to bring the actual number of motor rotations closer to the target number of motor rotations has reached the predetermined upper-limit output value (step ST108 or ST116 of FIG. 7). In short, the second example of the travel control processing is arranged to reduce the upper-limit output value of the motor control signal to lower the number of rotations so that the respective actual numbers of motor rotations of the left and right motors are allowed to substantially coincide with each other, and it can thereby keep the appropriate straight-ahead traveling performance of the machine 10.

Figure 8:
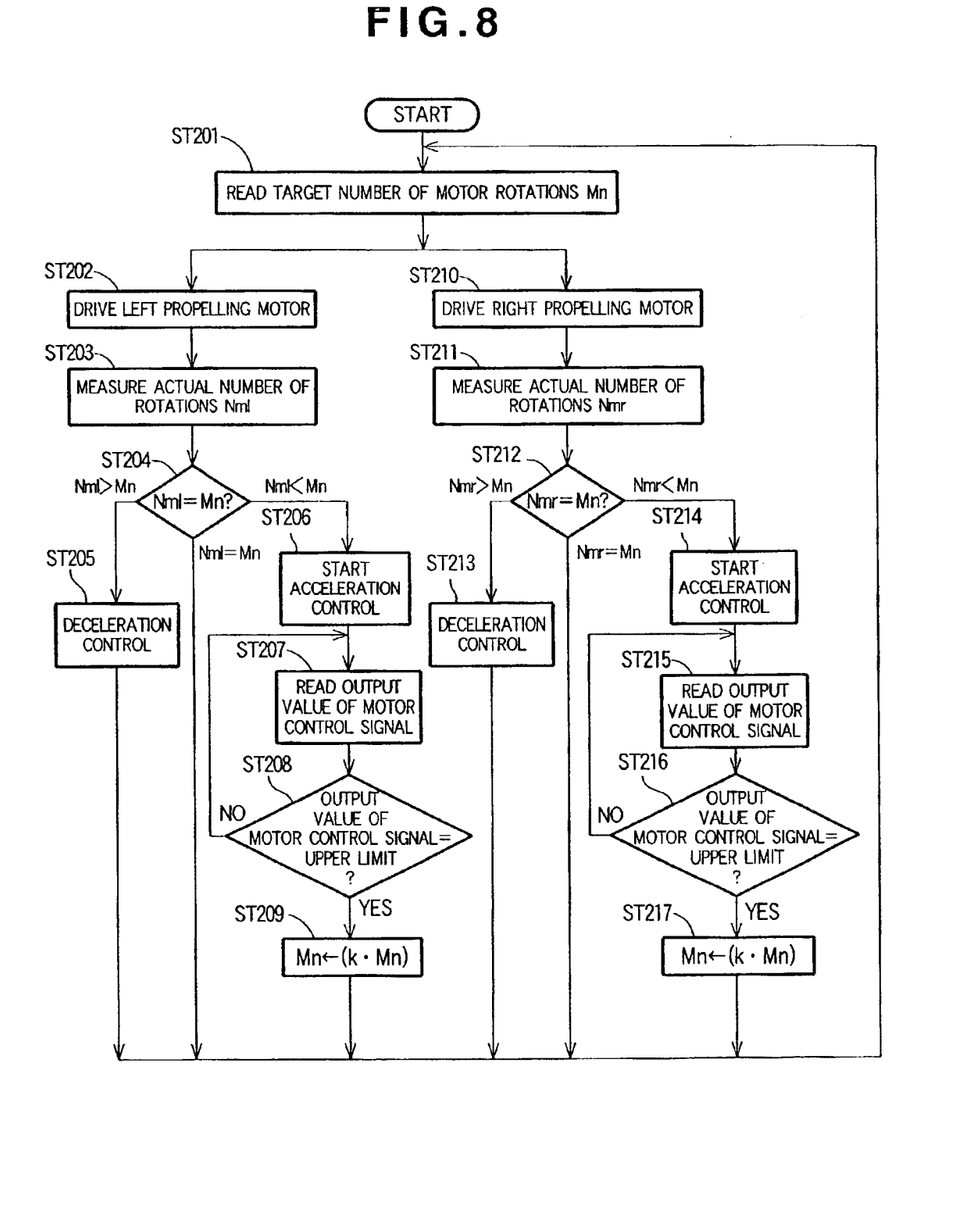
FIG. 8 is a flow chart showing an exemplary step sequence of still another example of the travel control processing performed by the control section.

Next, with reference to FIG. 8, a detailed description will be given about the third example of the travel control processing performed by the control section 44 to allow the snow removing machine to appropriately travel straight ahead as instructed by the human operator. FIG. 8 is a flow chart showing an exemplary step sequence of the third example of the travel control processing that is performed in the embodiment in response to a straight-ahead travel instruction given by the human operator.

At steps ST201, ST202 and ST203 of FIG. 8, the control section 44 carries out operations similar to the above-described operations of steps ST01, ST02 and ST03 of FIG. 6.

Step ST204: It is determined whether the measured current actual number of motor rotations Nml of the left propelling motor 25L is equal to the target number of motor rotations Mn. If an affirmative determination is made at this step, it means that there is no need to change the rotating state of the left propelling motor 25L, and thus the processing returns to step ST201 to repeat the above operations. If the current actual number of motor rotations Nml is greater than the target number of motor rotations Mn, it is judged that the left propelling motor 25L is rotating at an excessive speed, so that the processing proceeds to step ST205. If the current actual number of motor rotations Nml is smaller than the target number of motor rotations Mn, it is judged that the left propelling motor 25L is rotating at an insufficient speed, so that the processing branches to step ST206.

At steps ST205, ST206 and ST207 of FIG. 8, the control section 44 carries out operations similar to the above-described operations of steps ST05, ST06 and ST07 of FIG. 6.

Step ST208: A determination is made as to whether or not the motor control signal for performing the acceleration control is currently representing its predetermined upper-limit output value. If the motor control signal for performing the acceleration control is not currently representing the predetermined upper-limit output value i.e., with a NO determination), the processing returns to step ST207, while with a YES determination, the processing goes to step ST209.

Step ST209: The current target number of motor rotations Mn is multiplied by a positive coefficient k smaller than 1.0, and then the multiplied result k·Mn is set as a new target number of motor rotations Mn for the left propelling motor 25L; namely, in this case, the target number of motor rotations Mn is corrected downward by the coefficient "k" that is, for example, 0.5.

While the preceding paragraphs have described the control performed on the left propelling motor 25L, similar control is performed on the right propelling motor 25R as follows.

At steps ST210 and ST211 of FIG. 8, the control section 44 carries out operations similar to the above-described operations of steps ST10 and ST11 of FIG. 6.

Step ST212: It is determined whether the measured current actual number of motor rotations Nmr of the right propelling motor 25R is equal to the target number of motor rotations Mn. If an affirmative determination is made at this step, it means that there is no need to change the rotating state of the right propelling motor 25R, and thus the processing returns to step ST201 to repeat the above operations. If the current actual number of motor rotations Nmr is greater than the target number of motor rotations Mn, it is judged that the right propelling motor 25R is rotating at an excessive speed, so that the processing proceeds to step ST213. If the current actual number of motor rotations Nmr is smaller than the target number of motor rotations Mn, it is judged that the right propelling motor 25R is rotating at an insufficient speed, so that the processing branches to step ST214.

At steps ST213, ST214 and ST215 of FIG. 8, the control section 44 carries out operations similar to the above-described operations of steps ST13, ST14 and ST15 of FIG. 6.

Step ST216: A determination is made as to whether or not the motor control signal for performing the acceleration control is currently representing its predetermined upper-limit output value. If the motor control signal for performing the acceleration control is not currently representing the predetermined upper-limit output value (i.e., with a NO determination), the processing returns to step ST215, while with a YES determination, the processing goes to step ST217.

Step ST217: The current target number of motor rotations Mn is multiplied by the positive coefficient k smaller than 1.0, and then the multiplied result k·Mn is set as a new target number of motor rotations Mn for the right propelling motor 25R. Namely, the target number of motor rotations Mn is corrected downward by the coefficient "k".

After completion of the operation at step ST209 or ST217, the processing of FIG. 8 returns to step ST201 where the corrected target number of motor rotations Mn is set as a new target number of motor rotations Mn. The target number of motor rotations Mn read at next step ST201 will be thus smaller than the last target number of motor rotations. Repeating the above operations will allow the respective actual numbers of motor rotations of the left and right propelling motors 25L and 25R to substantially coincide with each other so that the appropriate straight-ahead traveling performance of the snow removing machine can be restored.

Namely, in the snow removing machine 10 where the left and right driving wheels 23L and 23R are driven by the left and right propelling motors 25L and 25R, the control section 44 performs the third example of the travel control processing of FIG. 8 which is characterized by carrying out the downward motor-rotation correction process for multiplying the target number of motor rotations by the positive coefficient k smaller than 1.0 to thereby reduce the target number of motor rotations (step ST209 or ST217 of FIG. 8) upon satisfaction of the three conditions that 1) the straight-ahead travel instruction has been given, 2) the current actual number of motor rotations is smaller than the target number of motor rotations (step ST204 or ST212 of FIG. 8) and 3) the motor control signal produced to bring the actual number of motor rotations closer to the target number of motor rotations has reached the predetermined upper-limit output value (step ST208 or ST216 of FIG. 8).

In short, the third example of the travel control processing is arranged to reduce the target number of motor rotations so that the respective actual numbers of motor rotations of the left and right motors are allowed to substantially coincide with each other, and it can thereby keep the appropriate straight-ahead traveling performance.

Figure 9:
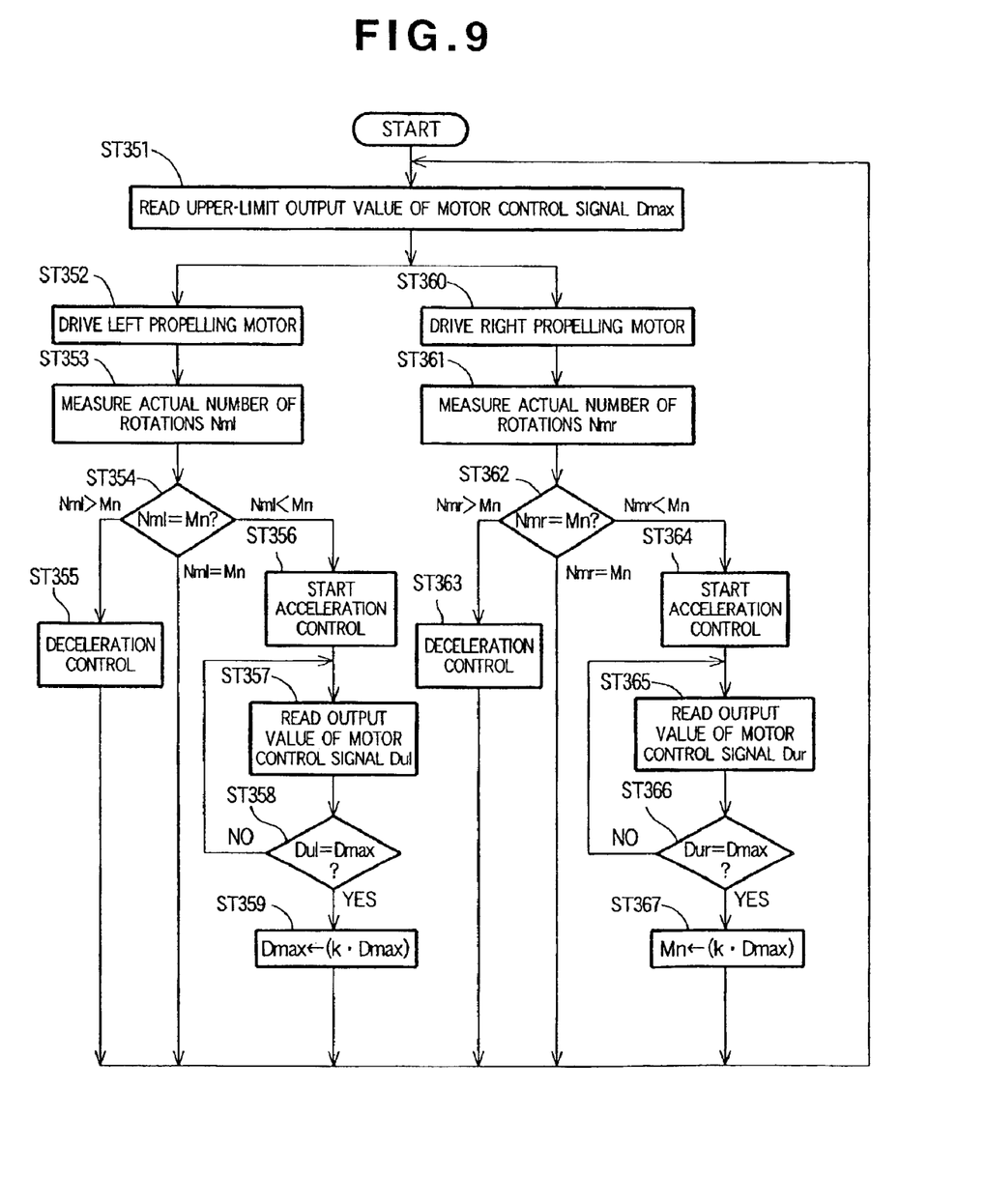
FIG. 9 is a flow chart showing an exemplary step sequence of still another example of the travel control processing performed by the control section.

Next, with reference to FIG. 9, a detailed description will be given about the fourth example of the travel control processing performed by the control section 44 to allow the snow removing machine to appropriately travel straight ahead as instructed by the human operator. FIG. 9 is a flow chart showing an exemplary step sequence of the fourth example of the travel control processing.

At steps ST352 and ST353 of FIG. 9, the control section 44 carries out operations similar to the above-described operations of steps ST102 and ST103 of FIG. 7.

Step ST354: It is determined whether the measured current actual number of motor rotations Nml of the left propelling motor 25L is equal to the target number of motor rotations Mn. If an affirmative determination is made at this step, it means that there is no need to change the rotating state of the left propelling motor 25L, and thus the processing returns to step ST351 to repeat the above operations. If the current actual number of motor rotations Nml is greater than the target number of motor rotations Mn, it is judged that the left propelling motor 25L is rotating at an excessive speed, so that the processing proceeds to step ST355. If the current actual number of motor rotations Nml is smaller than the target number of motor rotations Mn, it is judged that the left propelling motor 25L is rotating at an insufficient speed, so that the processing branches to step ST356.

At steps ST355, ST356 and ST357 of FIG. 9, the control section 44 carries out operations similar to the above-described operations of steps ST105, ST106 and ST107 of FIG. 7.

Step ST358: A determination is made as to whether or not the motor control signal Dul for performing the acceleration control of the left propelling motor 25L is currently representing its upper-limit output value Dmax. If the motor control signal Dul for performing the acceleration control is not currently representing the predetermined upper-limit output value (i.e., with a NO determination), the processing returns step ST357, while with a YES determination, the processing goes to step ST359.

Step ST359: The upper-limit output value Dmax of the motor control signal for the left propelling motor 25L is multiplied by a positive coefficient k smaller than 1.0, and the multiplied result k·Dmax is set as a new upper-limit output value Dmax of the motor control signal; namely, in this case, the upper-limit output value Dmax of the motor control signal for the left propelling motor 25L is corrected downward by the coefficient "k" that is, for example, 0.5.

While the preceding paragraphs have described the control performed on the left propelling motor 25L, similar control is performed on the right propelling motor 25R as follows.

At steps ST360 and ST361 of FIG. 9, the control section 44 carries out operations similar to the above-described operations of steps ST110 and ST111 of FIG. 7.

Step ST362: It is determined whether the measured current actual number of motor rotations Nmr of the right propelling motor 25R is equal to the target number of motor rotations Mn. If an affirmative determination is made at this step, it means that there is no need to change the rotating state of the right propelling motor 25R, and thus the processing returns to step ST351. If the current actual number of motor rotations Nmr is greater than the target number of motor rotations Mn, it is judged that the right propelling motor 25R is rotating at an excessive speed, so that the processing proceeds to step ST363. If the current actual number of motor rotations Nmr is smaller than the target number of motor rotations Mn, it is judged that the right propelling motor 25R is rotating at an insufficient speed, so that the processing branches to step ST364.

Then, at steps ST363, ST364 and ST365 of FIG. 9, the control section 44 carries out operations similar to the above-described operations of steps ST113, ST114 and ST115 of FIG. 7.

Step ST366: A determination is made as to whether or not the motor control signal Dur for performing the acceleration control of the right propelling motor 25R is currently representing its upper-limit output value Dmax. If the motor control signal Dur for performing the acceleration control is not currently representing the predetermined upper-limit output value (i.e., with a NO determination), the processing returns to step ST365, while with a YES determination, the processing goes to step ST367.

Step ST367: The upper-limit output value Dmax of the motor control signal for the right propelling motor 25R is multiplied by the positive coefficient k smaller than 1.0, and the multiplied result k·Dmax is set as a new upper-limit output value Dmax of the motor control signal; namely, in this case, the upper-limit output value Dmax of the motor control signal for the right propelling motor 25R is corrected downward by the coefficient "k".

After completion of the operation at step ST359 or ST367, the processing of FIG. 9 returns to step ST351 where the corrected upper-limit output value Dmax is set as a new upper-limit output value Dmax of the motor control signal. The upper-limit output value Dmax of the motor control signal read at next step ST351 will be thus smaller than the last upper-limit output value Dmax of the motor control signal. Repeating the above operations will allow the respective actual numbers of motor rotations of the left and right propelling motors 25L and 25R to substantially coincide with each other so that the straight-ahead traveling performance can be restored.

Namely, the fourth example of the travel control processing of FIG. 9, performed by the control section 44 of the snow removing machine 10, is characterized by carrying out the downward motor-rotation correction process for multiplying the upper-limit output value Dmax of the motor control signal by the positive coefficient k smaller than 1.0 to thereby reduce or downwardly correct the upper-limit output value of the motor control signal to "k·Dmax" (step ST369 or ST370 of FIG. 9), upon satisfaction of the three predetermined conditions that 1) the straight-ahead travel instruction has been given, 2) the current actual number of motor rotations is smaller than the target number of motor rotations (step ST354 or ST362 of FIG. 9) and the motor control signal produced to bring the actual number of motor rotations closer to the target number of motor rotations has reached the predetermined upper-limit output value (step ST358 or ST366 of FIG. 9). In short, the fourth example of the travel control processing is arranged to reduce the upper-limit output value of the motor control signal so that the respective actual numbers of motor rotations of the left and right motors are allowed to substantially coincide with each other, and it can thereby keep the appropriate straight-ahead traveling performance of the snow removing machine.

It should be appreciated that the application of the present invention is not limited to the snow removing machine as described above, and the present invention may also applied to other types of electric vehicles, such as electric transporting vehicles and electric golf carts.

In summary, the present invention is characterized by performing the downward motor-control process for downwardly correcting the target number of rotations or the upper-limit output value of the motor control signal, upon satisfaction of the three predetermined conditions that the straight-ahead travel instruction has been given by the human operator, the actual number of motor rotations of the electric motor is less than the target number of motor rotations and the motor control signal has reached its predetermined upper-limit output value. By performing such a downward motor-control process a plurality of times in succession, the present invention allows the respective actual numbers of rotations of the left and right electric motors to substantially coincide with each other, and it can thereby keep the appropriate straight-ahead traveling performance of the electric vehicle.

The present disclosure relates to the subject matters of Japanese Patent Application No. 2001-328089, filed Oct. 25, 2001, and Nos. 2001-333224 and 2001-333231, both filed Oct. 30, 2001, the disclosures of which are expressly incorporated herein by reference in their entireties.

What is claimed is:

1. An electric vehicle comprising: a vehicle body; left and right electric motors mounted on the vehicle body; left and right driving wheels mounted on the vehicle body and driven by the left and right electric motors, respectively; and a control section for producing a motor control signal to bring an actual number of motor rotations of each of the left and right electric motors closer to a target number of motor rotations of each of the left and right electric motors, and for performing a motor speed correction process for each of the left and right electric motors, including the steps of (a) determining whether or not three predetermined conditions have been satisfied, the three conditions comprising (1) that a straight-ahead travel instruction has been supplied to the electric vehicle for instructing the electric vehicle to travel in a straight direction at a speed corresponding to the target number of motor rotations, (2) that the actual number of motor rotations of each electric motor is less than the target number of motor rotations thereof, and (3) that the motor control signal for bringing the actual number of motor rotations closer to the target number of motor rotations has reached a predetermined upper limit output value, and (b) performing a downward motor-rotation correction process when the three predetermined conditions have been satisfied for at least one of the left and right electric motors, by progressively incrementally reducing one of the target number of motor rotations and the upper limit output value of the motor control signal until the respective actual numbers of rotations of the left and right motors substantially coincide with each other, to thereby cause the electric vehicle to travel in the straight direction.

2. An electric vehicle according to claim 1; wherein the control section performs the downward motor-rotation correction process by subtracting a given number of motor rotations from an immediately preceding value of the target number of motor rotations.

3. An electric vehicle according to claim 1; wherein the control section performs the downward motor-rotation correction process by subtracting a given value from an immediately preceding value of the upper-limit output value of the motor control signal.

4. An electric vehicle according to claim 1; wherein the control section performs the downward motor-rotation correction process by multiplying an immediately preceding value of the target number of motor rotations by a positive coefficient smaller than 1.0.

5. An electric vehicle according to claim 1; wherein the control section performs the downward motor-rotation correction process by multiplying an immediately preceding value of the upper-limit output value of the motor control signal by a positive coefficient smaller than 1.0.

6. An electric vehicle according to claim 1; further comprising left and right control handles extending rearward from the vehicle body; left and right grips provided at ends of the control handles; a left speed control lever provided alongside the left grip for controlling the left electric motor; and a right speed control lever provided alongside the right grip for controlling the right electric motor.

7. An electric vehicle according to claim 6; wherein the control section does not perform the downward motor-rotation correction process when either one of the left speed control lever and the right speed control lever is being operated.

8. An electric vehicle according to claim 1; further comprising an auger mounted to the vehicle body for displacing snow; and a blower mounted to the vehicle body for ejecting displaced snow.

9. An electric vehicle according to claim 1; further comprising a directional speed control member mounted to the vehicle body and being movable to a forward travel position, a neutral state position and a reverse travel position of the electric vehicle; wherein the directional speed control member produces the straight-ahead travel instruction when located in either one of the forward travel position and the reverse travel position.

10. An electric vehicle according to claim 9; further comprising a pair of left and right electromagnetic parking brakes for applying holding brakes to prevent rotation of the left and right driving wheels when the vehicle is in the neutral state.

11. An electric vehicle according to claim 1; further comprising a left-turning operation lever connected to the left electric motor via the control section, and a right-turning operation lever connected to the right electric motor via the control section, each of the left-turning operation lever and the right-turning operation lever being grippable by an operator to reduce the number of motor rotations of the corresponding electric motor to cause the electric vehicle to turn to the left or the right, the operation levers being in a released state when the straight-ahead travel instruction is given.

12. A method for controlling an electric vehicle having left and right electric motors for driving left and right driving wheels, comprising the steps of:

producing a motor control signal to bring an actual number of motor rotations of the left and right electric motors closer to a target number of motor rotations for each of the left and right electric motors; and performing a motor rotation correction process for each of the left and right electric motors by progressively incrementally reducing one of the target number of motor rotations and the upper limit output value of the motor control signal until the respective actual numbers of rotations of the left and right motors substantially coincide with each other, to thereby cause the electric vehicle to travel in a straight direction.

13. A method for controlling an electric vehicle according to claim 12; wherein the step of performing a motor rotation correction process is performed for each electric motor only when the actual number of motor rotations thereof is less than the target number of motor rotations, and the motor control signal has reached a predetermined upper limit output value.

14. A method for controlling an electric vehicle according to claim 12; wherein the step of performing a motor speed correction process is performed only when a straight-ahead travel instruction has been supplied to the electric vehicle for instructing the electric vehicle to travel in a straight direction at a speed corresponding to the target number of motor rotations.

15. A method for controlling an electric vehicle according to claim 14; wherein the electric vehicle further comprises a directional speed control member mounted to the vehicle body and being movable to a forward travel position, a neutral state position and a reverse travel position of the electric vehicle and for generating the straight-ahead travel instruction in both the forward travel position and the reverse travel position.

16. A method for controlling an electric vehicle according to claim 15; wherein the tool is an auger for displacing snow and a blower for ejecting displaced snow.

17. A method for controlling an electric vehicle according to claim 12; wherein the electric vehicle further comprises a tool, an engine for driving the tool and a clutch provided in a power transmission path from the engine to the tool.

18. A method for controlling an electric vehicle according to claim 12; wherein the step of performing the downward motor-rotation correction process comprises the step of subtracting a given value from one of an immediately preceding value of the target number of motor rotations and an immediately preceding value of the upper-limit output value of the motor control signal.

19. A method for controlling an electric vehicle according to claim 12; wherein the step of performing the downward motor-rotation correction process comprises the step of multiplying one of an immediately preceding value of the last target number of motor rotations and an immediately preceding value of the upper-limit output value of the motor control signal by a positive coefficient smaller than 1.0.

20. A method for controlling an electric vehicle according to claim 12; wherein the electric vehicle further comprises a left-turning operation lever connected to the left electric motor, and a right-turning operation lever connected to the right electric motor, each operation lever being grippable by an operator to reduce the number of motor rotations of the corresponding electric motor to cause the electric vehicle to turn to the left or the right.

* * * * *